(12) United States Patent  (10) Patent No.: US 7,140,286 B2
Schwartz  (45) Date of Patent: Nov. 28, 2006

(54) DUAL ADJUSTABLE FEATHER JIG

(76) Inventor: Neal K. Schwartz, 2626 - 186th Ave. NE., Redmond, WA (US) 98052

( * ) Notice: Subject to any disclaimer, the term of this patent is extended or adjusted under 35 U.S.C. 154(b) by 76 days.

(21) Appl. No.: 11/090,524

(22) Filed: Mar. 25, 2005

(65) Prior Publication Data
US 2005/0241450 A1  Nov. 3, 2005

Related U.S. Application Data

(60) Provisional application No. 60/567,617, filed on May 3, 2004.

(51) Int. Cl.
B26D 7/06 (2006.01)
B27B 7/02 (2006.01)

(52) U.S. Cl. ............... 83/446; 83/438; 83/447; 83/448; 83/450; 83/475; 144/253.6

(58) Field of Classification Search .......... 83/420, 83/438, 440, 440.1, 440.2, 442, 444, 446–450, 83/475, 477.2; 144/243, 251.1, 251.2, 251.3, 144/253.1, 253.2, 253.6, 253.7, 253.8, 253.9
See application file for complete search history.

(56) References Cited

U.S. PATENT DOCUMENTS

| 695,228 | A | * | 3/1902 | Oakley | 144/253.1 |
| 1,022,176 | A | * | 4/1912 | Boothby | 144/243 |
| 1,094,657 | A | * | 4/1914 | Jenkins | 144/251.1 |
| 1,402,667 | A | * | 1/1922 | Shaw | 144/129 |
| 2,578,516 | A | * | 12/1951 | Crow | 144/253.6 |
| 2,612,914 | A | * | 10/1952 | Reynolds | 144/250.18 |
| 4,165,668 | A | | 8/1979 | McCord, Jr. | 83/435.11 |
| 4,259,887 | A | | 4/1981 | Dean | 83/435.14 |
| 4,454,793 | A | | 6/1984 | Strong | 83/421 |
| 4,476,757 | A | | 10/1984 | Morris | 83/446 |
| 4,741,387 | A | | 5/1988 | Strong | 83/421 |
| 5,000,237 | A | | 3/1991 | Berkeley et al. | 144/251 |
| 5,038,486 | A | | 8/1991 | Ducate, Sr. | 33/430 |
| 5,337,641 | A | | 8/1994 | Duginske | 83/468 |
| 5,546,670 | A | * | 8/1996 | Chiang | 33/640 |
| 5,743,161 | A | | 4/1998 | Boudreau | 83/435.11 |
| 5,845,410 | A | | 12/1998 | Boker | 33/536 |
| 6,315,016 | B1 | * | 11/2001 | Jukoff | 144/253.6 |
| 6,446,687 | B1 | * | 9/2002 | Jukoff | 144/253.6 |
| 6,619,347 | B1 | * | 9/2003 | Jukoff et al. | 144/253.6 |
| 6,718,857 | B1 | * | 4/2004 | Kimmel et al. | 83/447 |
| 6,968,766 | B1 | * | 11/2005 | Kimmel et al. | 83/447 |
| 7,017,464 | B1 | * | 3/2006 | Coderre | 83/446 |
| 2002/0162439 | A1 | * | 11/2002 | Fontaine | 83/438 |
| 2005/0005754 | A1 | * | 1/2005 | Coderre | 83/446 |

* cited by examiner

Primary Examiner—Clark F. Dexter
(74) Attorney, Agent, or Firm—Dean A. Craine

(57) ABSTRACT

A dual adjustable feather jig for simultaneously holding a piece of wood stock firmly against a stationary rip fence and against the top surface of a worktable. The feather jig includes a lower feather board with a 'T' in channel bar adjustably mounted on the bottom surface of the lower feather board to laterally adjust the lower feather board over the worktable. Mounted transversely on the lower feather board is an upper feather board assembly that includes a vertical feather board to hold the wood piece against the worktable. The vertical feather board is connected to a slider arm that slides longitudinally over a riser block securely mounted to the lower feather board. Formed on the lateral and lower edges of the lower and vertical feather boards, respectively, are diagonally aligned fingers that press the wood piece against the rip fence and against the top surface of the worktable.

10 Claims, 4 Drawing Sheets

DUAL ADJUSTABLE FEATHER JIG

This utility patent application claims the benefit of provisional patent application (Ser. No. 60/567,617) filed on May 3, 2004.

BACKGROUND OF THE INVENTION

1. Field of the Invention
2. Description of the Related Art

Table saws and router tables (herein after often include a rip fence attached to the top surface of the table and parallel to the saw blade. Most worktables also include a 'T' slot formed on the top surface of the table that extends parallel to the rip fence and on the side of the saw blade or router bit opposite the rip fence. The 'T' slot is designed to receive a 'T' channel attached to the bottom surface of a miter guide that is used to push the wood stock towards the saw blade or router bit.

Heretofore, adjustable feather boards have been used on table saws to 'cut' a piece of wood stock in a longitudinal direction parallel with the grain. Feather boards typically include a set of fingers located along one edge that press the piece of wood stock against the rip fence and prevents it from drifting during the cutting or routing operation.

When cutting a piece of wood stock longitudinally (also, called ripping) or when shaping the wood stock with a router bit, it is also important to firmly hold the wood stock downward against the top surface of the worktable.

Because many rip fences used today are not securely held down at both ends to the worktable, mounting a vertical feather board to the rip fence is undesirable because the rip fence may rise off the worktable. Also, it is impossible to laterally reposition the vertical feather board with respect to the rip fence if the vertical feather board is directly clamped to the rip fence.

Unfortunately, no device exists today that simultaneously holds the wood stock firmly against the rip fence and firmly against the top surface of the worktable.

SUMMARY OF THE INVENTION

These and other objects of the present invention are met by the dual adjustable feather jig disclosed herein for simultaneously holding a piece of wood stock firmly against a rip fence and firmly against the top surface of the worktable. The jig includes a lower feather board with a downward extending 'T'-shaped channel bar slidingly mounted on the bottom surface of the lower feather board. The 'T'-shaped channel bar is designed to slide freely in a standard 'T' slot formed on the top surface of the worktable. Two transversely aligned, elongated slots are formed on the lower feather board that received two-threaded adjustment knobs used to selectively tightened and lock the lower feather board and the 'T'-shaped channel bar together so that the lower feather board may be adjusted and locked in a desired distance from the rip fence.

Formed on one lateral edge of the lower feather board is a first set of diagonally aligned fingers designed to press against the vertical side of a piece of wood stock to force the wood stock against a rip fence aligned parallel to the 'T' slot Mounted transversely on the top surface of the lower feather board is an adjustable upper feather board assembly used to apply a downward force of the wood stock when the wood stock is being cut or shaped. The upper feather board assembly includes an adjustably mounted, vertically aligned upper feather board. Formed on the lower edge of the upper feather board is a second set of diagonally aligned fingers designed to be pressed against the top surface of the work stock to hold it downward against the worktable. The upper feather board is adjustably mounted on the front surface of a horizontally aligned cross bar by two threaded adjustment knobs. During use, the upper feather board may be selectively lowered and raised with respect to the cross bar so that the second set diagonally aligned fingers can be repositioned to press against pieces of wood stock with different thicknesses.

Securely attached to the center axis of the cross bar is a perpendicularly aligned slider arm. The slider arm is longitudinally aligned and selectively locked in a fixed position to a riser block. The riser block is securely attached to the top surface of the lower feather board and perpendicularly aligned with the 'T' channel bar.

During use, the lower and upper feather boards are adjusted so that the piece of wood stock may be simultaneously held against the rip fence and forced downward against the top surface of a worktable. Because the 'T' channel bar is designed to fit into a standard 'T' slot, the jig can be used on any standard table saw or router table. Because the positions of the upper and lower feather boards can be adjusted relative to each other, to the rip fence, and to the saw blade and router bit, the jig may be used with a wide variety of different cutting or shaping jobs with different sizes of wood stock.

DESCRIPTION OF THE PREFERRED EMBODIMENT(S)

Figure 1:
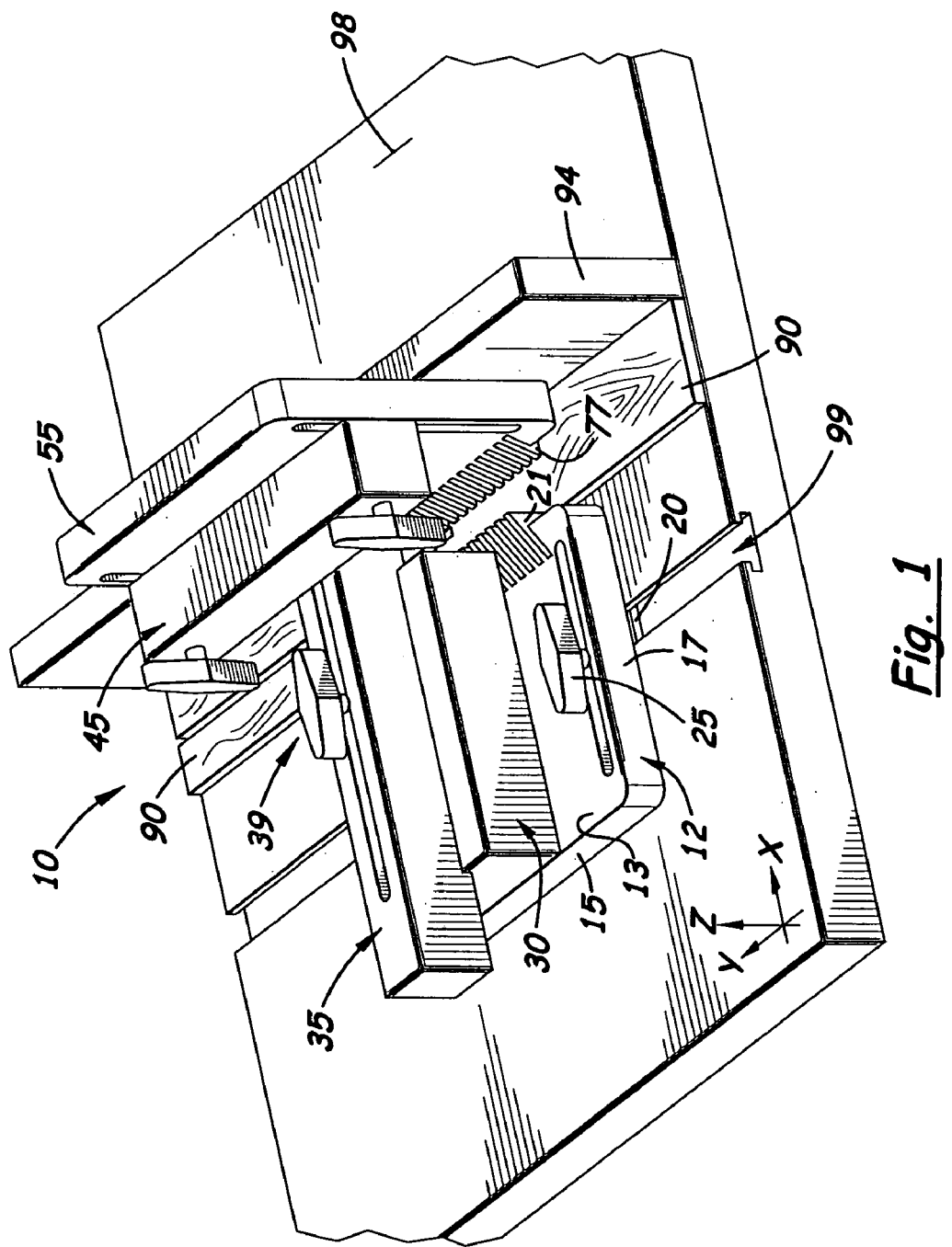
FIG. 1 is a perspective view of the dual adjustable feather jig used to hold a wood piece on a worktable with a tool fence.
Figure 2:
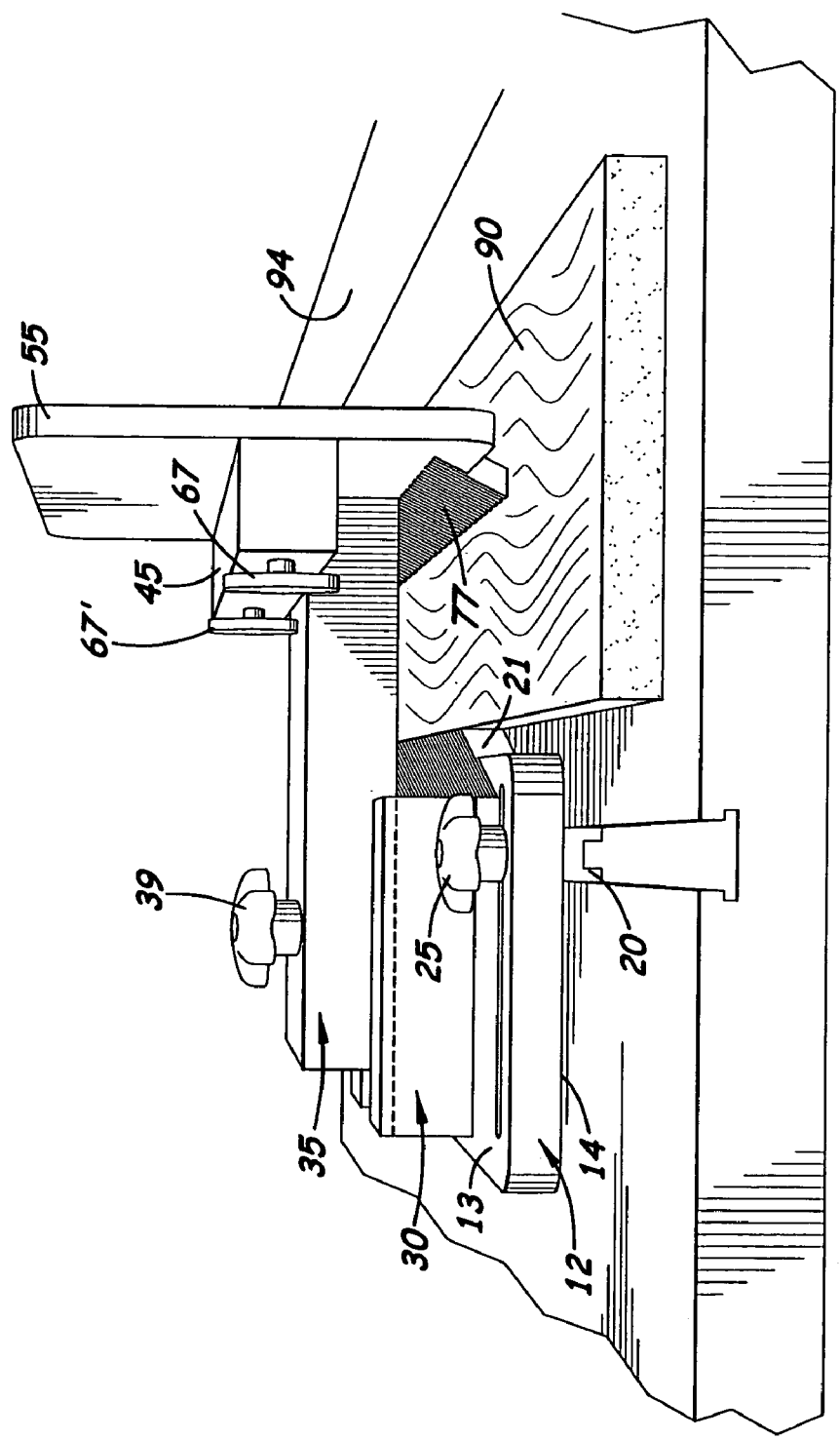
FIG. 2 is a side elevational view of the invention.
Figure 3:
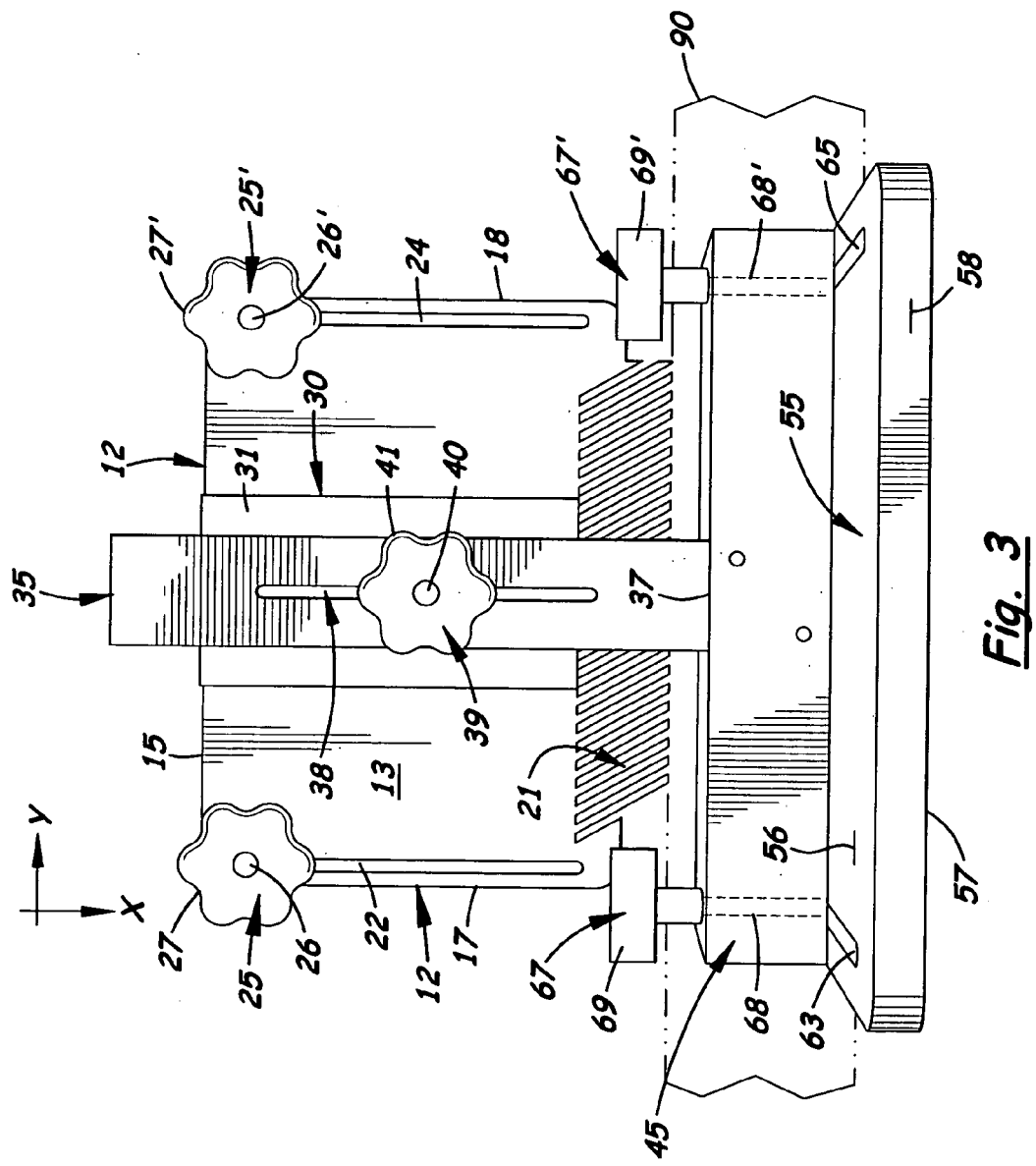
FIG. 3 is a top plan view of the invention.
Figure 4:
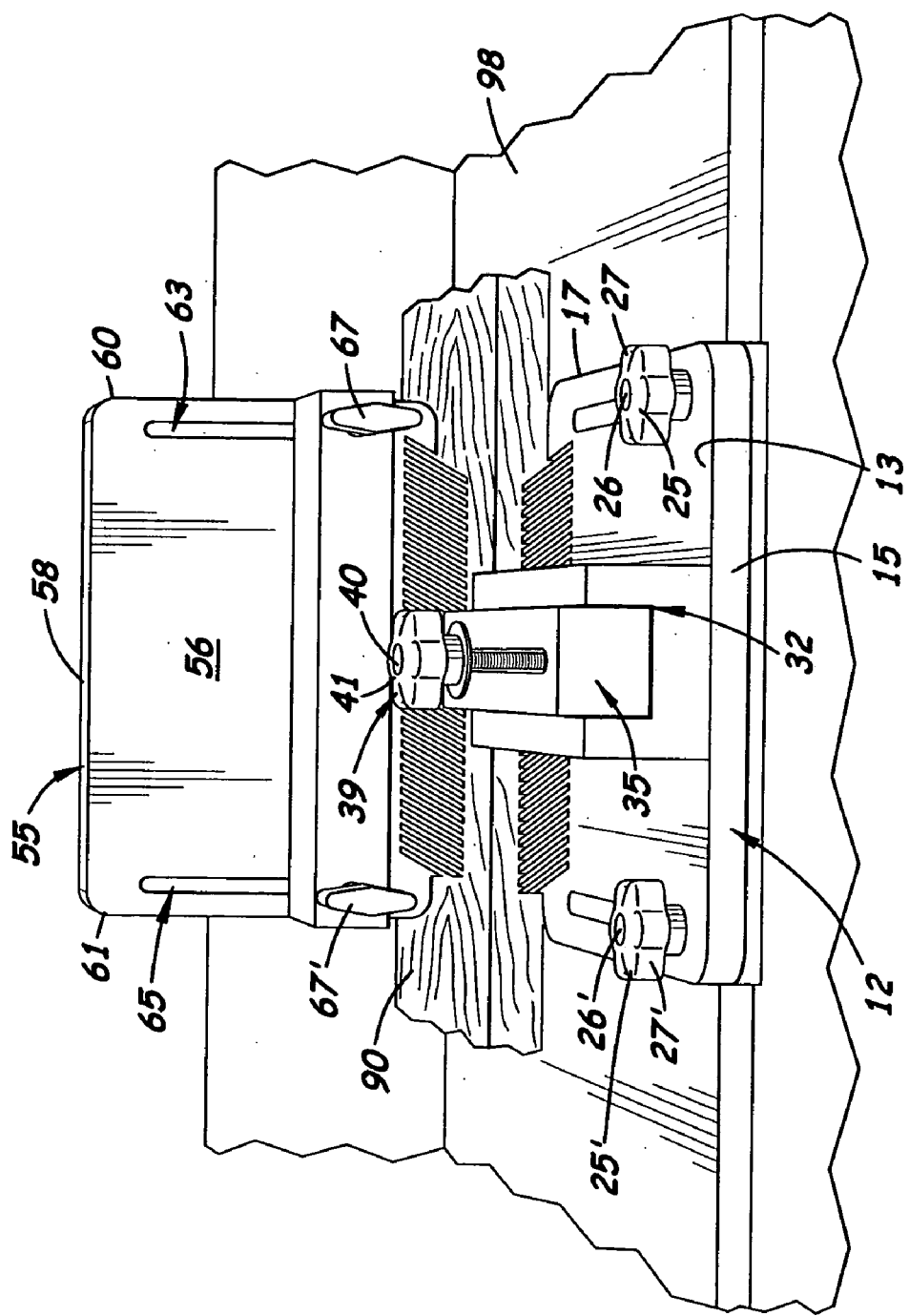
FIG. 4 is a perspective view of the invention.

Shown in the accompanying Figs is an adjustable dual feather jig 10 for simultaneously holding a piece of wood stock 90 firmly against the lateral surface of a rip fence 94 and holding the piece of wood stock 90 firmly downward against the top surface of a worktable 98.

The feather jig 10 disclosed includes a horizontally aligned lower feather board 12 which is slidingly attached to the worktable 98, such as a table saw, router table, or shaper table. The lower feather board 12 includes a planar top surface 13, a planar bottom surface 14, left vertical edge 15, a front vertical edge 17, and a back vertical edge 18. Aligned on the bottom surface 14 and extending from the front vertical edge 17 to the back vertical edge 18 is a 'T' channel bar 20. The 'T' channel bar 20 is designed to slide freely into a standard 'T' slot 99 formed on the worktable 98 that is aligned parallel to the rip fence 94 or saw blade (not shown). The 'T' slot 99 is approximately ¾ inches wide and the 'T' slot channel bar 20 is approximately ¾ inch wide and approximately ⅜ inch deep.

Formed on the lower feather board 12 near the front and back vertical side edges 17, 18 are two elongated slots 22, 24, respectfully. The slots 22, 24 are transversely aligned on the lower feather board 12 and designed to receive two threaded adjustment knobs 25, 25', respectively. Each knob 25, 25' includes a bolt 26, 26' attached to a turn handle 27, 27', respectively. Attached to the 'T' channel bar 20 are two threaded bores (not shown) that attach to the distal ends of the bolts 26, 26' to adjustably connect the 'T' channel bar 20 to the bottom surface 14 of the lower feather board 12.

During use, the lower feather board 12 can be adjusted in the lateral direction (indicated by 'X' in FIG. 1) by loosening the two adjustment knobs 25, 25' The jig 10 may be moved longitudinally (indicated by the 'Y' direction) by pushing or pulling the lower feather board 12 inside the 'T' slot 99. By tightening the adjustment knobs 25, 25', the lower feather board 12 is securely affixed to the worktable 98.

Securely attached to the top surface 13 of the lower feather board 12 is an elongated riser block 30. Formed on the top surface 31 of the riser block 30 is a fully extending, channel-shaped groove 32 designed to receive a complimentary-shaped slider arm 35. During use, the slider arm 35 is able to slide freely in either direction ('X' direction) inside the groove 32. In the preferred embodiment, the riser block 30 is sufficient in height to allow an upper feather board 55 discussed further below to extend over the top of a piece of wood stock 90 being cut or shaped. The riser block 30 also acts as a support structure for the cross bar 45 for securely holding the upper feather board 55 in a fixed elevated position over the piece of wood stock 90. Formed on the slider arm 35 is a longitudinally aligned elongated slot 38. During assembly, an adjustment knob 39 comprising a threaded bolt 40 and handle knob 41 extends through the slot 38 and attaches to a threaded bore (not shown) formed near one end of the riser block 30. During use, the slider arm 35 is longitudinally aligned inside the groove 32 and then locked in position by tightening the adjustment knob 39 into the threaded bore (not shown). The slider arm 35 and the slot 38 are both is sufficient in length so that upper feather board 55 may remain attached to the riser block 30 and be selectively positioned over the left edge, right edge or over the center axis of a piece of wood stock 90.

The distal end 37 of the slider arm 35 is permanently attached to the lower surface of a perpendicular aligned cross bar 45. The cross bar 45 is an elongated, rectangular structure that is adjustably mounted to the inside surface 56 of the upper feather board 55.

The upper feather board 55 includes a planar inside surface 56, a planar outside surface 57, a top lower or horizontal edge 58, a bottom horizontal edge, a front vertical edge 60 and a back vertical edge 61. Formed near the opposite front and rear edges 60, 61 are two vertically aligned elongated slots 63, 65, respectfully. During assembly, two adjustment knobs 67, 67' that includes two threaded bolts 68, 68', and knob handles 69, 69', extend through two bores formed at the crossbar 45 and into the two slots 63, 65, respectfully. The adjustment knobs 67, 67' are loosened or tightened to allow the upper feather board 55 to be vertically adjusted with respect to the crossbar 45 (indicated by "Z" on the drawings in FIG. 1).

Formed on the right vertical edge of the lower feather board 12 and on the lower edge on the upper feather board 55, respectively, are two sets of diagonally aligned fingers 21, 77 that press against a piece of wood stock 90 to simultaneously hold it against the rip fence 94 and against the top surface of the worktable 98.

When assembled properly, the jig 10 is very stable on the worktable 98 and provides for a safe method to machine a piece of wood stock 90. The jig 10 reduces fatigue normally experienced when trying to forcibly hold a piece of wood stock 90 against the rip fence 94 and downward on the worktable 98 with your fingers. Because the user's fingers don't need to be repositioned against the blade or bit, tool burns on the wood stock 90 are eliminated. When properly set-up, the piece of wood stock 90 can be simply pushed over the blade or bit and pulled out from the other side of the blade or bit without placing hands or fingers anywhere near the blade or bit.

The feather jig 10 is specifically designed to be used on standard table saws with miter T-slots. Table saws without a miter T-slot will require a machine shop to modify the old style miter slot into a miter T-slot. Most upper end saws will have the miter T-slot.

The feather jig 10 is also very useful on router tables with miter T-slots for doing long routing jobs. Several suppliers sell a miter T-channel that can be retro-fitted on existing router tables. A miter T-channel of ¾ inch by ⅜ inch size must be used, however, smaller size miter T-channels will require a different T-slot piece for mounting the feather jig 10 to the worktable 98.

In compliance with the statute, the invention described herein has been described in language more or less specific as to structural features. It should be understood, however, that the invention is not limited to the specific features shown, since the means and construction shown is comprised only of the preferred embodiments for putting the invention into effect. The invention is therefore claimed in any of its forms or modifications within the legitimate and valid scope of the amended claims, appropriately interpreted in accordance with the doctrine of equivalents.

I claim:

1. A dual adjustable feather jig for holding a piece of wood stock firmly against a tool fence and at the same time holding the wood piece firmly down against a worktable, said jig comprising:
   a. a lower feather board assembly that includes a lateral feather board with an adjustably mounted, downward extending 'T' channel member capable of being mounted into a 'T' slot formed on the top surface of a worktable of a standard table saw or router, said lower feather board includes a first set of diagonally aligned fingers that press against a piece of wood stock to hold the wood piece against a standard tool fence;
   b. a 'T' channel locking means used to lock said 'T' channel member on said lateral feather board;
   c. a riser block transversely mounted on the top surface of said lateral feather board, said riser block including a longitudinally aligned slot;
   d. a vertical feather board that includes a second set of diagonally aligned fingers that press against the wood piece located below to hold the wood piece against the top surface of the worktable;
   e. a lateral slider perpendicularly aligned and attached at one end to said vertical feather board, said lateral slider being inserted into said slot formed on said riser block enabling said vertical feather board to be positioned at different distances from said lateral feather board;
   f. means for locking said lateral slider on said riser block; and,
   g. means for adjustably locking said vertical feather board to said lateral slider.

2. The dual adjustable feather jig, as recited in claim 1, wherein said 'T' channel member is a 'T' channel bar that slides freely in a 'T' shaped slot formed on the worktable.

3. The dual adjustable feather jig, as recited in claim 2, wherein said means for locking said lateral slider in said riser block is a threaded adjustable knob that extends through said slider and attaches to said riser block.

4. The dual adjustable jig, as recited in claim 2, wherein said means for adjustably locking said vertical feather board is a crossbar perpendicularly aligned and securely attached to said lateral slider, said crossbar being adjustably mounted to the rear surface of said vertical feather board.

5. The dual adjustable feather jig, as recited in claim 1, wherein said means for locking said lateral slider in said riser block is a threaded adjustable knob that extends through said slider and attaches to said riser block.

6. The dual adjustable jig, as recited in claim 5, wherein said means for adjustably locking said vertical feather board is a crossbar perpendicularly aligned and securely attached to said lateral slider, said crossbar being adjustably mounted to the rear surface of said vertical feather board.

7. The dual adjustable jig, as recited in claim 1, wherein said means for adjustably locking said vertical feather board is a crossbar perpendicularly aligned and securely attached to said lateral slider, said crossbar being adjustably mounted on the rear surface of said vertical feather board.

8. A dual adjustable feather jig for simultaneously holding a piece wood stock firmly against a rip fence attached to a worktable and against the top surface of the worktable, said jig comprising:
  a. a lower feather board with a first set of diagonally aligned fingers formed along at least one edge that presses against a piece of wood stock located adjacent thereto;
  b. means for slidingly attaching said lower feather board to the worktable parallel so that said lower feather board moves in direction parallel to said rip fence;
  c. a vertical feather board located above and attached to said lower feather board, said vertical feather board including a second set of diagonally aligned fingers formed on one edge, said vertical feather board perpendicularly aligned over said lower feather board so said second set of diagonal fingers press downward over the top surface of the piece of wood stock while the first set of diagonally aligned fingers press inward and hold the piece of wood stock firmly against the rip fence;
  d. means for sliding said vertical feather board horizontally over said lower feather board thereby enabling a user to adjust the location of the second set of diagonally aligned lingers over the piece of wood stock placed against the top surface of the worktable; and,
  e. means for adjusting the height of said vertical feather board relative to said lower feather board to accommodate pieces of wood stock with different thicknesses.

9. The dual adjustable feather jig, as recited in claim 8, wherein said means for sliding said vertical feather board is a riser block attached to the top surface of said lower feather board and a lateral slider longitudinally aligned over said riser block and perpendicularly aligned and attached at one end to said vertical feather board.

10. The dual adjustable feather jig, as recited in claim 9, wherein said means for adjusting the height of said vertical feather board relative to said lower feather board is a crossbar longitudinally aligned and adjustable to the rear surface of the vertical feather board and attached to the distal end of said lateral slider.

* * * * *